United States Patent [19]
Bryan et al.

[11] 3,923,959
[45] Dec. 2, 1975

[54] METHOD FOR PREPARING ACTINIDE NITRIDES

[75] Inventors: Garry H. Bryan, Arvada; Jesse M. Cleveland, Boulder; Clinton R. Heiple, Boulder, all of Colo.

[73] Assignee: The United States of America as represented by the United States Energy Research and Development Administration, Washington, D.C.

[22] Filed: Nov. 28, 1973

[21] Appl. No.: 419,833

[52] U.S. Cl............ 423/251; 252/301.1 R; 423/249; 423/250; 423/252; 423/254
[51] Int. Cl.² ...................... C01G 56/00; C01G 43/00; C01F 15/00
[58] Field of Search ............. 423/11, 249, 250, 251, 423/252, 254; 252/301.1 R

[56] References Cited
UNITED STATES PATENTS 3,758,669  9/1973  Potter et al. .......................... 423/254
3,766,082  10/1973  Tennery et al. .................. 423/254 X

OTHER PUBLICATIONS

Seaborg et al., *The Transuranium Elements*, Part II, pp. 945–948, McGraw Hill Book Company, Inc. (1949), New York.

*Primary Examiner*—Leland A. Sebastian
*Assistant Examiner*—E. A. Miller
*Attorney, Agent, or Firm*—John A. Horan; Dudley W. King; Ignacio Resendez

[57] ABSTRACT

Actinide nitrides, and particularly plutonium and uranium nitrides, are prepared by reacting an ammonia solution of an actinide compound with an ammonia solution of a reactant or reductant metal, to form finely divided actinide nitride precipitate which may then be appropriately separated from the solution. The actinide nitride precipitate is particularly suitable for forming nuclear fuels.

12 Claims, 1 Drawing Figure

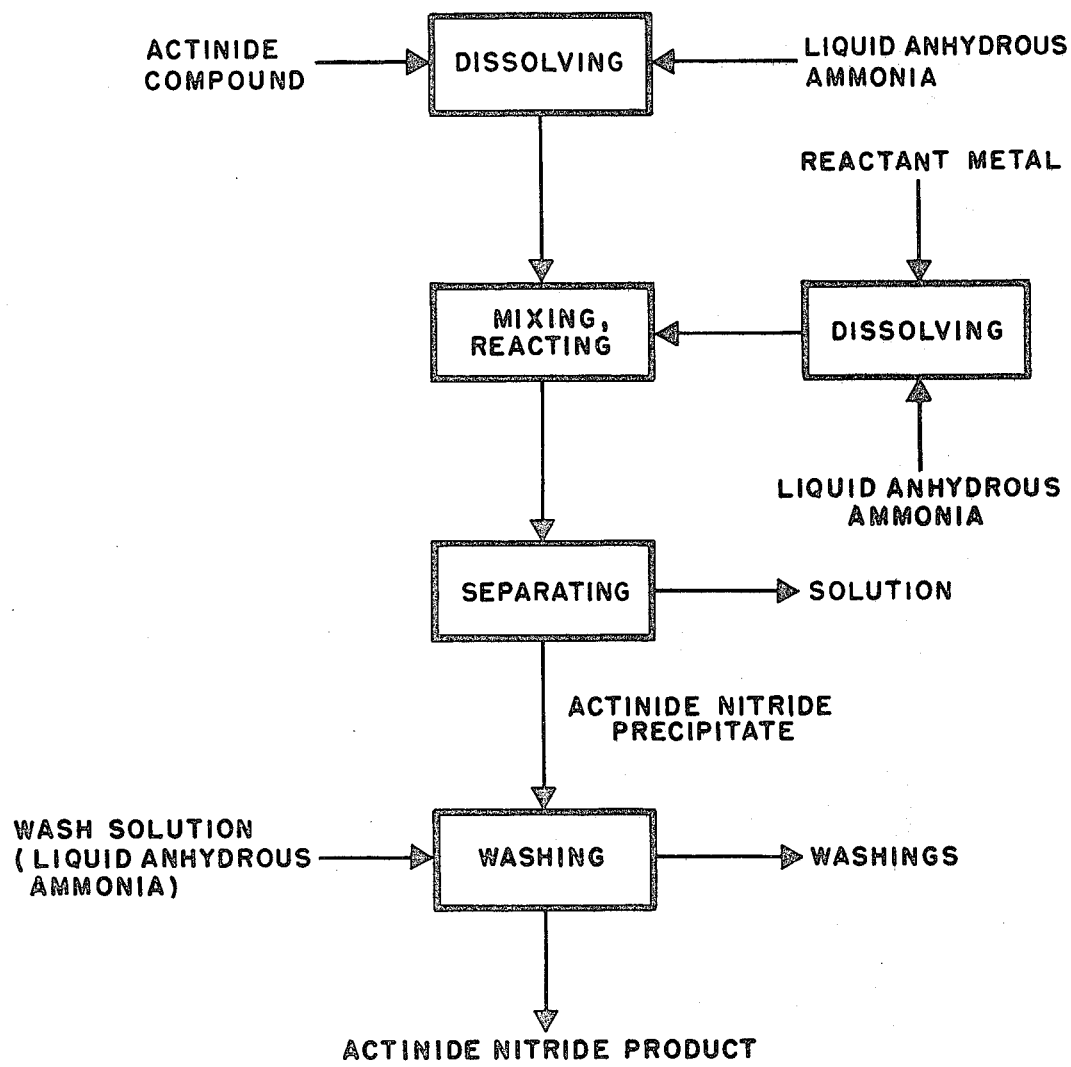

METHOD FOR PREPARING ACTINIDE NITRIDES

BACKGROUND OF INVENTION

The invention relates to a low temperature method for preparing actinide nitrides, and particularly plutonium nitride and uranium nitride.

Some generally known prior art methods for preparing actinide nitrides such as plutonium nitride involve either the reduction of plutonium oxide with carbon in a nitrogen atmosphere, or hydriding the plutonium metal followed by heating the hydride in a nitrogen atmosphere. These methods involve reaction at temperatures above 500°C.

Drawbacks to the above prior art processes are the high temperature requirement, the necessity for cyclic heating to obtain complete conversion to the nitride, and, in the case of the carbon reduction method, the high carbon and oxygen impurity levels of the product.

SUMMARY OF INVENTION

In view of disadvantages such as noted hereinabove, it is an object of this invention to provide a novel method for producing actinide nitrides, and more particularly plutonium nitride and uranium nitride as well as mixtures of these nitrides.

It is a further object of this invention to provide a novel method for the preparation of finely divided actinide nitrides suitable for preparing nuclear fuels.

It is a further object of this invention to provide an actinide nitride precipitate having a crystal or crystallite size of about 25 Angstroms or less.

Various other objects and advantages will appear from the following description of the invention and are particularly pointed out hereinafter in connection with the appended claims. Various changes in design, materials, processing sequence, etc., as described herein may be made by those skilled in the art without departing from the scope and principles of this invention as brought out in the appended claims.

The invention comprises dissolving an actinide compound in liquid anhydrous ammonia and mixing with an ammonia solution of an alkali metal, alkaline earth metal, or lanthanide metal to effect reaction and yield an actinide nitride precipitate which may then be separated from the solution.

DESCRIPTION OF DRAWING

The drawing illustrates a typical process for forming actinide nitride product.

DETAILED DESCRIPTION

The invention as described herein, is performed in a dry, non-oxidizing, non-acidic atmosphere such as nitrogen, ammonia, or inert gas such as argon or helium. As shown in the drawing, in practicing this invention, a suitable quantity of liquid anhydrous ammonia soluble actinide compound, or a mixture of these soluble compounds, in a form such as one or more actinide halides, is dissolved in liquid anhydrous ammonia. The term liquid anhydrous ammonia is used to refer to liquid ammonia having a maximum of about 5,000 ppm water. The actinide group of elements in the periodic table includes elements such as plutonium, uranium, thorium, americium, neptunium, actinium, curium, and californium. After dissolution, the resultant solution may be mixed with another liquid anhydrous ammonia solution of a reactant or reductant metal, hereinafter generally referred to as reactant metal, such as an alkali metal, an alkaline earth metal, or a lanthanide metal. Although the amount added may effect an incomplete formation of all the actinide nitride potentially available, one skilled in the art will recognize that maximum actinide nitride precipitation may be achieved when the quantity added is sufficient to equal or exceed the stoichiometric requirements of the reaction. Typical alkali metals include potassium, sodium, cesium, lithium, rubidium, etc. Typical alkaline earth metals include barium, calcium, strontium, etc. Typical lanthanide metals which may be used are such as europium and ytterbium.

Although the exact chemical mechanisms by which the actinide nitride is formed have not been established, applicants believe that the reactant metal provides solvated electrons to reduce the actinide ions and the ammonia supplies nitrogen to form the nitride. It is understood that this theory does not in any way limit or restrict the scope of the invention to which applicants are entitled.

The following equation is an example of one that may be used to proximately calculate the amount of reactant metal to be added

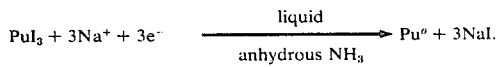

$$\text{PuI}_3 + 3\text{Na}^+ + 3e^- \xrightarrow[\text{anhydrous NH}_3]{\text{liquid}} \text{Pu}^o + 3\text{NaI}.$$

Complete reaction of the actinide is assured by adding an about 10 percent excess of the amount of reactant metal required for reacting with the actinide material completely in the above equation.

In a typical process using this invention, about 2 grams of plutonium triiodide were dissolved in about 400 milliliters of liquid anhydrous ammonia at a pressure of about 610 Torr and a temperature of between about −33°C and −77°C. This was then mixed with about 100 milliliters of liquid anhydrous ammonia solution containing about 0.15 grams of sodium to effect reaction and formation of a plutonium nitride precipitate weighing about 0.300 grams which was separated by filtration and washed three times with liquid anhydrous ammonia. In runs using this typical process, plutonium nitride precipitate was obtained that contained from about 4.9 to about 5.8 weight percent nitrogen (theoretical for plutonium nitride is 5.5 weight percent nitrogen). The table contains data of various runs.

In order to obtain a larger-sized nitride precipitate for a desired purpose such as to allow x-ray powder diffraction studies, the product may be annealed in a vacuum or inert gas atmosphere at about 700°C for from about 24 to about 48 hours or more. X-ray diffraction patterns of vacuum-annealed plutonium nitride corresponded quite well with known x-ray diffraction pattern for plutonium nitride and thus confirmed the chemical analysis of the as-precipitated chemical product.

It should be noted that although the plutonium halide is dissolved in liquid anhydrous ammonia, and subsequently added to or mixed with a separate solution containing a reactant, it may be possible to effect the same plutonium nitride reaction and formation by adding the reactant metal directly to the solution containing actinide salt which is to be reacted.

The plutonium nitride precipitate formed in the process described herein is of an extremely small crystal or crystallite size such as about 25 Angstroms or less and as such is especially advantageous for use in fabricating reactor fuels since the small size greatly enhances sinterability. Moreover, the invention has the added advantage of eliminating the need for high temperature reactions during preparation of the actinide nitride and of producing a nitride product substantially free of carbon and oxygen contamination.

This invention provides a novel, low temperature method for producing an actinide nitride, by dissolving an actinide compound in liquid anhydrous ammonia and then mixing this solution with another liquid anhydrous ammonia solution of a reactant metal such as an alkali metal, an alkaline earth metal, or a lanthanide metal. Mixing effects a reaction forming an actinide nitride precipitate in the solution and the product may then be easily separated by filtration, centrifugation, or the like. The reaction is essentially independent of temperature and should be possible under any conditions of temperature and pressure at which ammonia exists as a liquid. The reaction may be performed at atmospheric pressure and temperatures between about −33°C and about −77°C or at higher temperatures if the pressure is correspondingly increased. The process is relatively insensitive to solution concentrations provided that the stoichiometric requirement is met.

2. The method of claim 1 wherein said dissolving comprises dissolving said actinide compound in liquid anhydrous ammonia to form a first solution, dissolving said reactant metal in liquid anhydrous ammonia to form a second solution, mixing said ammonia solutions to effect said reaction forming said actinide nitride precipitate.

3. The method of claim 1 further including separating said actinide nitride precipitate from said solution.

4. The method of claim 1 further including annealing said actinide nitride precipitate to increase said precipitate crystal size.

5. The method of claim 4 wherein said annealing comprises heating at about 700°C for from about 24 to about 48 hours in an atmosphere selected from the group consisting of inert gas and vacuum.

6. The method of claim 1 wherein said reactant metal is selected from the group consisting of an alkali metal, an alkaline earth metal, and a lanthamide metal.

7. The method of claim 1 wherein said reactant metal is selected from the group consisting of sodium, potassium, calcium, barium, lithium, rubidium, cesium, strontium, europium and ytterbium.

8. The method of claim 1 wherein said atmosphere is taken from the group consisting of ammonia, nitrogen, an inert gas and mixtures thereof.

TABLE

| Run No. | Actinide Starting Compound | Actinide Compound Conc.[1] (g/l[2] $NH_3$) | Reactant | Reactant Conc.[3] (g/l $NH_3$) | Yield[4] (g) | Percent Nitrogen in Product[5] Analysis 1 | Percent Nitrogen in Product[5] Analysis 2 | Residual Reactant in Product (percent) |
|---|---|---|---|---|---|---|---|---|
| 1 | $PuI_3$ | 5.0 | Na | 1.5 | 0.300 | 5.77 | — | 0.32 |
| 2 | $PuI_3$ | 3.75 | Na | 1.5 | 0.300 | 5.27 | 4.86 | 0.31 |
| 3 | $PuI_3$ | 5.0 | Na | 1.5 | 0.325 | 5.49 | 5.58 | 0.32 |
| 4 | $PuI_3$ | 6.25 | Na | 1.5 | 0.400 | 5.20 | 4.95 | 2.0; 2.5 |
| 5 | $PuI_3$ | 6.25 | Na | 1.5 | 0.257 | 4.60 | 3.89 | 0.69; 0.69 |
| 6 | $PuI_3$ | 6.25 | K | 2.5 | 0.267 | 4.82 | — | 0.53 |
| 7 | $PuI_3$ | 5.0 | Ca | 1.25 | 0.065 | 5.56 | — | 0.11 |
| 8 | $UI_4$ | 3.75 | Na | 1.5 | 0.480 | 5.58 | 5.17 | 1.9 |
| 9 | $UI_4$ | 3.75 | Na | 1.5 | 0.505 | 4.51 | 4.99 | 4.9 |
| 10 | $UI_4$ | 3.75 | Na | 1.5 | 0.550 | 4.99 | 5.34 | 3.5 |

NOTES:
[1] All runs used 400 ml of actinide solution
[2] g/l = grams per liter
[3] All runs used 100 ml of reactant solution, except runs 4, 5, and 6 which used 200 ml.
[4] Products from all runs washed 3 times with liquid anhydrous ammonia.
[5] Calculated percent nitrogen for PuN is 5.53 and for UN it is 5.56.

What is claimed is:

1. A method for forming actinide nitride precipitate selected from the group consisting of plutonium nitride, uranium nitride and thorium nitride, comprising providing a substantially dry, non-oxidizing and non-acidic atmosphere, dissolving an actinide compound wherein the actinide is selected from the group consisting of plutonium, uranium and thorium and a reactant metal in liquid anhydrous ammonia effecting a reaction and formation of said actinide nitride precipitate of a crystal size of between greater than zero and about 25 Angstroms.

9. The method of claim 1 wherein said reaction is conducted at a temperature of from about −33°C to about −77°C.

10. The method of claim 1 wherein said actinide compound is selected from the group consisting of liquid anhydrous ammonia soluble actinide halides.

11. The method of claim 1 wherein said actinide compound is taken from the group consisting of plutonium triiodide, uranium tetraiodide, uranium triiodide, and thorium tetraiodide.

12. The product made by the process of claim 1.

* * * * *